United States Patent Office 2,952,520
Patented Sept. 13, 1960

2,952,520

MANUFACTURE OF MANGANESE CARBONYLS

Harold E. Podall and Hymin Shapiro, Baton Rouge, La., assignors to Ethyl Corporation, New York, N.Y., a corporation of Delaware No Drawing. Filed Dec. 23, 1957, Ser. No. 704,285

6 Claims. (Cl. 23—203)

This invention is concerned with manganese carbonyls and a process for their manufacture.

Some metal carbonyls, such as those of iron and nickel, are comparatively easy to produce, while, on the other hand, those of manganese are difficult to prepare. For example, it has been reported in the literature that manganese pentacarbonyl can be prepared by reacting manganese iodide with magnesium in diethyl ether under a high pressure of carbon monoxide. This procedure suffers particular disadvantages which prevent its employment in a commercial sense. In particular, the only manganese halide employable is manganese iodide prepared by the reaction of cuprous iodide with manganese metal. Likewise, as yet no substitute for diethyl ether has been found. A still further disadvantage of the process is that the yields are low and unaffected by increase in temperature and pressure.

Another procedure reported for the preparation of manganese pentacarbonyl, although such was not produced apparently in recoverable yield, is the reaction of an ether suspension of manganese iodide with a Grignard reagent under a pressure of carbon monoxide. This procedure has been improved somewhat by judicious choice of the Grignard reagents employed. However, even with these improvements the process suffers particular disadvantages which are to be overcome. For instance, for some unexplained reason the process is independent of variables such as pressure beyond a certain point. Essentially no change is obtained in the rate of reaction or in the yield when such variables are changed. A still further disadvantage of the process is that by-product metal is formed which cannot be converted to the desired carbonyl compound.

Accordingly, it is an object of this invention to provide a novel process for the manufacture of manganese carbonyls. Another object is to provide a process for the manufacture of manganese carbonyls in higher yield and purity than heretofore obtainable. These and other objects will be apparent as the discussion proceeds.

The objects of this invention are obtained by reacting a manganese salt, including the oxides and sulfides, with a stable organometallic compound of an element from the group III–A elements of the periodic chart of the elements and carbon monoxide. While the benefits of this invention are generally realized when employing any of the group III–A organometallic compounds those of aluminum are particularly preferred because of their greater reactivity and economy. Likewise the manganese halides, oxides, sulfides or salts of low molecular weight organic acids are preferred, the latter being especially preferred.

When employing the procedure of this invention, simultaneous reaction of the manganese salt, organometallic compound and carbon monoxide is obtained thus providing an enhancement in yield, faster reaction rates and minimization of undesirable by-product metals. Another advantage of the process of this invention is that a diverse number of manganese salts can be employed along with various diluents if desired. A still further advantage of the process is that the metal carbonyl is directly produced in the reaction, whereas in the past processes employing the Grignard reagents, at the completion of the reaction, as pointed out in the work by Hieber et al., Z. Anorg. Chem. 221,321 (1935), it is necessary to quench with water to obtain the product. Other advantages of the process of this invention will be evident as the discussion proceeds.

The manganese salts employable are many and varied. For the purposes herein the oxides and sulfides of manganese are also intended in the terminology "salts" although such are not truly salts. The salts can be both inorganic and organic in nature. Typical examples of the inorganic salts include the halides, phosphates, sulfides, sulfates, nitrates, fluosilicates, carbonates, oxides and the like. The organic salts include, for example, the carboxylates, e.g., alkyl, aryl, cycloalkyl, and the like; the alcoholates, e.g., phenates, alkoxides, phenolates, and enolates, and the thioalcoholates or mercaptides. Among the inorganic salts employable in the process of this invention are manganese bromide, iodide, fluoride and chloride, manganese carbonate, the various manganese oxides, manganese phosphate, manganese fluosilicate, manganese sulfate, manganese sulfide, manganese sulfite, and the like. Among the organic salts of manganese employable are included for example, manganese acetate, manganese benzoate, manganese citrate, manganese formate, manganese lactate, manganese oxalate, manganese malonate, manganese valerate, manganese naphthenate, manganese oleate, manganese acetylacetonate, manganese toluate, manganese phenate, manganese ethylate, manganese decanoate, manganese thiomethylate, and the like. It is to be understood that all valence states of manganese are intended. For example, "manganese" is meant to denote both the manganic and manganous salts. For best results the manganese halides, oxides, sulfides and salts of alkanoic acids having from about 1 to 8 carbon atoms are especially preferred. The aforementioned manganese salts of alkanoic acids are especially preferred over the oxides, sulfides and halides since higher yields are obtained with such salts. In those instances wherein the manganese salt is a solid in the reaction mixture it is generally desirable to employ such material in finely divided form of the order of about 1000 microns or less.

The organometallic compound employed in the process is one of an element of the group III–A elements of the periodic table. Such elements include boron, aluminum, gallium, indium, and thallium. The organometallic compound will usually contain between about 1 to 25 carbon atoms in each organic radical. In general, the metal is attached to at least one carbon atom of an organic radical. It can additionally, however, be attached to other elements, as for example, the halides, hydrogen or another metal, particularly the group I–A metals. Typical examples of the group III–A organometallic compounds include the following: trimethylboron, triethylboron, ethylboron difluoride, sodium tetraethylborate, trimethylaluminum, triethylaluminum, methyldiethylaluminum, tripropylaluminum, dimethylhexylaluminum, methylethyloctylaluminum, triisooctylaluminum, diethylaluminum hydride, methylaluminum dihydride, triisobutylaluminum, diisobutylaluminum hydride, octylaluminum dihydride, sodium aluminum tetraethyl, lithium aluminum tetraethyl, potassium aluminum triethyl hydride, sodium aluminum tetrabutyl, potasisum aluminum dioctyl dihydride, dimethylaluminum chloride, ethylaluminum dichloride, ethylaluminum sesquichloride, trimethylgallium, triethylgallium, methyldiethylgallium, tripropylgallium, trioctylgallium, triisobutylgallium, trimethylindium, triethylindium, tripropylindium, triisobutylindium, triphenyl aluminum, sodium aluminum diethyl acetylide, cyclohexyl diethyl aluminum, tribenzyl aluminum, triethyl thallium, triphenyl thallium and similar such compounds of the group III–A elements.

For practical purposes and best results, the alkyl aluminum compounds are preferably employed. These compounds are more stable, more readily available and are of higher reactivity. Generally, each alkyl group therein will contain from 1 up to and including about 8 carbon atoms.

In general, the process of this invention is readily performed by adding the manganese salt and the organometallic compound into a reaction vessel and pressurizing with carbon monoxide. If desired, the reaction can be conducted in the presence of an essentially inert liquid medium. The reaction mixture is usually agitated to provide adequate contact. In most instances the simultaneous reaction of these materials will take place at room temperature although heating is preferred to effect greater reaction rates. At the completion of the reaction the manganese carbonyl is recovered in a conventional manner such as distillation, sublimation, or separation of the by-product leaving the product in the liquid medium, when employed, which can then be recovered by concentration and filtration.

The process of this invention will be more fully understood by reference to the following examples. In all examples the parts and yields are by weight.

*Example I*

To a reactor equipped with external heating means, internal agitation, means for maintaining pressure, means for admitting and discharging reactants and products, was added 2½ parts of manganous acetylacetonate and a solution of 4½ parts of triethyl aluminum in 30 parts of dry benzene under an inert atmosphere of nitrogen. The reactor was then pressurized with 3500 p.s.i.g. of carbon monoxide, agitation was commenced and the temperature was raised to 165° C. These conditions were maintained for a period of 3 hours. At the end of this period, after cooling to room temperature, the gases in the reactor were vented to the atmosphere, and the reaction mixture was quenched with water and dilute hydrochloric acid. The benzene layer was separated and dried with "drierite." The dry benzene layer was subjected to vacuum distillation at a temperature of 25–80° C. to concentrate the product. This concentrated liquor was then cooled in an ice bath and the solids filtered therefrom. In this manner 0.45 part of yellow crystalline manganese pentacarbonyl dimer, assaying 96 percent pure was obtained. The yield amounted to 22 percent based on manganous acetylacetonate. The yield prior to the quenching operation and separation of the benzene, as obtained by infrared analysis of an aliquot, was 29 percent.

Similar results are obtained when the above example is repeated at 500 p.s.i.g. of carbon monoxide for 10 hours.

*Example II*

Example I was essentially duplicated with the exception that the reaction was conducted for 6 hours. The yield of manganese pentacarbonyl dimer in this instance was 43 percent.

*Example III*

The procedure of Example I was repeated with the exception that 25 parts of diethyl ether were employed in place of the benzene, the pressure of carbon monoxide was 3000 p.s.i.g. and the reaction was conducted at 25° C. for 6 hours. An 8 percent yield of manganese pentacarbonyl dimer was obtained.

The following example demonstrates the effect of temperature in the process of the present invention as compared to the results obtained in the preceding example.

*Example IV*

The procedure of Example III was repeated with the exception that reaction was conducted at 100° C. for 3 hours. The yield of manganese pentacarbonyl dimer was 34 percent.

*Example V*

When employing the procedure of Example I with the exception that 1.3 parts of manganous chloride were reacted with triethylaluminum at 165° C. for 6 hours, the yield of manganese pentacarbonyl dimer was 8 percent.

*Example VI*

When employing the procedure of Example IV with the exception that 1.7 parts of manganous acetate were used in place of manganous acetylacetonate, the yield of manganese pentacorbonyl dimer was 34 percent. The molar proportion of the triethylaluminum to manganous acetate was thus 4 to 1.

*Example VII*

When employing the procedure of Example VI with the exception that 35 parts of diethyl ether were used in place of 25 parts of diethyl ether and a 6 hour reaction time used in place of a 3 hour reaction time, the yield of manganese pentacarbonyl dimer was 42 percent.

*Example VIII*

When employing the procedure of Example VI with the exception that 40 parts of anisole were used in place of diethyl ether and a 1 hour reaction time used in place of a 3 hour reaction time, the yield of manganese pentacarbonyl dimer was 36 percent. When the reaction time was increased to 2 hours, the yield was 44 percent.

*Example IX*

The procedure of Example I was repeated except that 3.4 parts of diethylaluminum hydride in 30 parts of diethyl ether were reacted with the manganese acetylacetonate at 100° C. and 3000 p.s.i.g. of carbon monoxide for 1 hour. The yield of manganese pentacarbonyl dimer was 19 percent.

*Example X*

When manganese sulfide is reacted with trimethyl thallium and carbon monoxide in pyridine according to the procedure of Example I, manganese pentacarbonyl dimer is obtained.

Substituting triphenyl gallium or tribenzyl indium for trimethyl thallium and diethyl ether for pyridine in the above example with the reaction temperature at 100° C. produces similar results.

*Example XI*

The procedure of Example II is repeated with the exception that 1.7 parts of manganese acetate are reacted with 3.9 parts of triethyl boron in 35 parts of diethyl ether at 100° C. under the same carbon monoxide pressure. Manganese pentacarbonyl dimer is obtained.

Similar results are obtained when other manganese salts are employed in place of the manganese salts of the above examples, as for example, manganese oxide, manganous naphthenate, manganous oleate, manganese formate, manganese phenolate, manganese ethylate, and the like. Likewise for the organoaluminum and boron compounds employed in the above examples other group III–A organometallic compounds can be employed. For example, trimethylaluminum, dimethylaluminum hydride, triphenylaluminum, triisobutylaluminum, sodium aluminum tetraethyl, ethyl aluminum sesquichloride, diethylaluminum bromide and similar such compounds of boron, indium, gallium and thallium may be substituted.

The temperature at which the reaction is conducted is, in general, not critical. Usually a temperature between about 0 to 200° C. is employed although the higher the temperature the faster the reaction rate. In order to enhance the reaction rate and to achieve best results it is preferred to operate at a temperature between about 75 to 175° C. Similarly the pressure can be varied over a wide range from superatmospheric, as about 3000 atmospheres, to subatmospheric pressures. Ordinarily pressures above atmospheric are employed. A preferred range is between about 500 to 4000 p.s.i.g. in order to obtain optimum results. The time of reaction will depend somewhat upon the conditions under which the reaction is conducted although times up to about 20 hours are generally quite adequate. In order to minimize side effects it is preferred to conduct the reaction for a period of from 5 minutes to 6 hours.

The proportions of the reactants can likewise be varied and generally are based on the metal salt. In this connection between about 0.65 mole to 15 moles and higher of the organometallic compound are employed per mole of the metal salt. However, as the temperature is increased the number of moles of the organometallic compound generally can be decreased.

Another characteristic feature of the process of this invention is that, in general, at any given temperature, increasing the molar proportion of the organometallic compound to that of the manganese salt will result in higher yield. Thus, it is frequently highly desirable and preferable to employ between about 5 moles to 10 moles of the organometallic compound per mole of the manganese salt. The following example will more adequately demonstrate the enhancement in yield when using the higher molar proportions.

*Example XII*

The procedure of Example VI was duplicated essentially as described but 1.7 parts of manganese acetate were reacted with 11.4 parts of aluminum triethyl in 28 parts of diethyl ether at the same temperature, same carbon monoxide pressure, and for the same time, namely, 100° C. and 3 hours at 3000 p.s.i.g. Thus the molar proportion of the aluminum triethyl to manganese acetate was 10:1. The yield of manganese pentacarbonyl dimer obtained in this manner was 79 percent thus demonstrating the effect of increasing the molar proportions.

The employment of such excesses is not wasteful of the organometallic compound since when the above example is slightly modified to recover the product by vacuum distillation or sublimation from the reaction mixture, the aluminum triethyl, which is left as residual liquid, can then be recovered and recycled for further use.

The carbon monoxide, being in gaseous form, is generally pressurized in the system in amounts sufficient to produce the manganese carbonyl. Large excesses can be employed without disadvantage since such excess is readily recovered and recycled for further use.

As demonstrated by the above examples, an organic diluent is usually employed although not required. Generally speaking such diluents should be essentially inert to the reactants. Among such organic diluents which can be employed are included the hydrocarbons, ethers and amines. Among the hydrocarbons included are for example nonanes, octadecanes, hexanes, toluene, benzene, xylene, mesitylene and mixed hydrocarbons such as gasoline, diesel oil and the like petroleum fractions.

Among the ethers employable are included for example the non-aromatics, aromatics and polyethers including for example, di-sec-butyl ether, di-n-heptyl ether, diisopropyl ether, ethylisoamyl ether, methylphenyl ether (anisole), p-tolyl ether, ethylphenyl ether, tetraethylene glycol dimethyl ether, dioxane, tetrahydrofuran and the dimethyl, diethyl, and di-n-butyl ethers of diethylene glycol. Among the amines which are employable are included dimethyl amine, diethyl amine, dioctyl amine, diphenyl amine, dicyclohexyl amine, methylethyl amine, p-methyl pyridine, o-methyl pyridine, 2,6-dimethyl pyridine, isoquinoline, trimethyl amine, triethyl amine, tributyl amine, tricyclohexyl amine, and the like. The coordinating solvents, particularly the ethers, for example anisole, are especially preferred since these materials exhibit a reaction promoting effect.

The process of this invention provides products which are of considerable use. A particularly advantageous use for the compounds produced is as additives to fuels for internal combustion engines and the like. For example, when sufficient manganous pentacarbonyl is added to commercial gasoline to obtain compositions containing one gram of manganese per gallon, the octane number of the gasoline is increased about 5 octane numbers. The products produced are also useful as chemical intermediates in preparing other organometallic compounds. These and other uses will be evident to those skilled in the art.

Having thus described the process of this invention it is not intended that it be limited except as set forth in the following claims.

We claim:

1. A process for the manufacture of manganese pentacarbonyl dimer which comprises reacting a manganese salt with a stable organometallic compound of a group III-A element and carbon monoxide at a temperature of 0-200° C., said carbon monoxide pressure being from atmospheric to about 3,000 atmospheres, said organometallic compound having a metal atom bonded directly to a carbon of the organo group.

2. The process of claim 1 wherein the organometallic compound is a compound of the element aluminum.

3. A process for the manufacture of manganese pentacarbonyl dimer which comprises reacting manganese acetate with aluminum triethyl and carbon monoxide at a temperature of 0° to 200° C., said carbon monoxide pressure being from 0 to 3000 atmospheres.

4. The process of claim 2 wherein the organo group of the organometallic compound is an alkyl group containing from 1 to 8 carbon atoms.

5. The process of claim 1 wherein the organometallic compound is employed in a concentration of between about 5 moles to about 10 moles per mole of manganese salt.

6. The process of claim 2 wherein the reaction is conducted in an ether solvent.

References Cited in the file of this patent

UNITED STATES PATENTS 2,739,169    Hagemeyer _____ Mar. 20, 1956

OTHER REFERENCES

Hurd et al.: Journal of American Chemical Society, vol. 71, p. 1899, May 1949.

Sidgwick: Chemical Elements and Their Compounds, vol. 1, 1950, p. 415.